UNITED STATES PATENT OFFICE.

ALEXANDER H. SIEGFRIED, OF SOUTH BEND, INDIANA, ASSIGNOR TO HIMSELF AND GEORGE B. GARMAN.

IMPROVEMENT IN REFINING AND TEMPERING IRON AND STEEL.

Specification forming part of Letters Patent No. 113,583, dated April 11, 1871; reissue No. 4,507, dated August 8, 1871.

*To all whom it may concern:*

Be it known that I, ALEXANDER H. SIEGFRIED, of South Bend, in the county of St. Joseph and State of Indiana, have invented certain Improvements in the art of Tempering and Refining Steel; and I do hereby declare that the following is a full, clear, and exact description thereof and of the materials used by me.

This invention relates to the refining and tempering of steel in the process of manufacturing articles from steel; and my invention consists, first, in treating the steel, while in process of forging, with a new composition, by the chemical action of which the quality of the steel is improved by purification; secondly, by using in tempering the steel, when forged into the required form, a bath of certain substances in solution, by which the temper and quality of the steel are improved; and, thirdly, by uniting in one process the two operations, whereby a better result is obtained than could be effected by the use of either alone.

To enable those skilled in the art to practice my improved process, I will now particularly describe the same.

I first heat the steel to a cherry-red in an ordinary clean smith's fire, then withdraw it from the fire and immediately cover the steel with pure chloride of sodium (common salt) and cleanse the fire by throwing upon it a portion of the same salt, and again return the steel to the fire, and cover it with a compound composed of twelve (12) parts of chloride of sodium, pure, and one (1) part each of pure sulphate of copper, sal-ammoniac, and sal-soda, together with one-half part of pure nitrate of potassa, all by weight. The above proportions may be slightly varied without materially altering or modifying the result, but the use of the above-mentioned chemicals, and in substantially the proportions above given, has been found by me to produce the best results. I then again return the steel to the fire and heat it to a cherry red, as before, and then withdraw it from the fire and refine by hammering upon the anvil; and again return it to the fire and raise it to the same degree of heat as before; then withdraw it from the fire and again cover the steel with said compound above described, and again return the steel to the fire and heat to a cherry red, as before; and then withdraw it from the fire and plunge it at once into a bath composed of rain-water, one gallon; nitrate of potassa, pure, one-half ounce; alum, one and one-half ounce; sal-soda, one ounce; sal-ammoniac, one-half ounce; and chloride of sodium, six ounces; and in substantially the same proportions when a greater or lesser quantity of this solution is required.

The use of sulphate of copper and sal-soda, or their equivalents, applied to steel during the forging of the same I believe to be new, and I claim the use of these ingredients independently of the others, as, while modifying and improving the results, such ingredients are not absolutely essential.

What I claim as my improvement in the art of purifying and tempering steel, and desire to secure by Letters Patent, is—

1. The mode of purifying steel in the process of forging by applying in their powdered state sulphate of copper and sal-soda, substantially in the manner set forth.

2. The use of a powder applied during the process of forging steel, compounded of substantially the ingredients set forth, or their equivalents.

3. A bath for tempering steel, compounded of the ingredients substantially as set forth, or their equivalents.

4. The process of purifying and tempering steel by the use of the powder and bath, respectively, compounded substantially as set forth.

In testimony whereof I have signed my name to this specification before two subscribing witnesses.

A. H. SIEGFRIED.

Witnesses:
D. P. HOLLOWAY,
B. EDW. J. EILS.